United States Patent [19]
Burgett

[11] Patent Number: 4,890,889
[45] Date of Patent: Jan. 2, 1990

[54] REPLACEABLE SPINDLE ASSEMBLY

[76] Inventor: Paul D. Burgett, 1330 - 14th St., NW., Canton, Ohio 44703

[21] Appl. No.: 891,067

[22] Filed: Jul. 31, 1986

Related U.S. Application Data

[63] Continuation of Ser. No. 613,817, May 25, 1984, abandoned.

[51] Int. Cl.⁴ .............................................. B60B 35/14
[52] U.S. Cl. .................................................. 301/132
[58] Field of Search ............... 403/335, 336, 337, 380; 301/124 R, 131, 132, 134, 135

[56] References Cited

U.S. PATENT DOCUMENTS

| | | | |
|---|---|---|---|
| 612,455 | 10/1898 | Gore | 403/336 X |
| 726,209 | 4/1903 | Wilson | 301/132 |
| 774,042 | 11/1904 | Cooper | 301/132 |
| 1,183,927 | 5/1916 | Watts | 301/132 |
| 2,282,552 | 5/1942 | Banowetz | 403/336 X |
| 2,501,579 | 3/1950 | Pointer | 301/132 X |
| 3,961,827 | 6/1976 | Mankowski et al. | 301/132 |

Primary Examiner—Russell D. Stormer
Attorney, Agent, or Firm—James D. Hall; Thomas J. Dodd; Todd A. Dawson

[57] ABSTRACT

A replaceable spindle assembly which includes a pair of plates connecting the spindle to the axle and fastened together by mounting bolts. One plate includes annular ribs which fit within annular grooves in the other plate to distribute the shear forces transmitted by the spindle to the axle through the plates.

2 Claims, 3 Drawing Sheets

REPLACEABLE SPINDLE ASSEMBLY

This is a continuation of co-pending application Ser. No. 613,817 filed on May 25, 1984, and now abandoned.

SUMMARY OF THE INVENTION

This invention relates to a replaceable spindle assembly for a vehicle axle assembly.

A spindle is a commonplace device fastened to the ends of a vehicle axle which serves as a mount for the vehicle wheels. Heretofore, spindles were connected to the axle by welding the spindle directly to the axle or by bolting. A drawback of the welded construction was that the spindle was not removable by the average person from the axle in event of spindle failure. Also, the bolted constructions did not adequately protect against the shear force on the spindle connection while in place on the vehicle. These prior spindle constructions are seen generally in U.S. Pat. Nos. 774,042; 1,480,462; 1,410,863; 774,289; 726,209; and 2,501,579.

The spindle assembly of this invention includes a pair of complemental plate members attached respectively to the axle and the spindle. One plate member has a pair of annular grooves formed in its outer face. The other plate member has a pair of annular ribs protruding from its outer face which fit within the grooves of the one plate. Both plates include aligned bores through which bolts are turned to secure the plates together. So constructed the spindle is easily replaced upon failure and provides greater support against shear forces upon the plate-connecting bolts as the axle supports the vehicle.

Accordingly, it is an object of this invention to provide for an improved vehicular spindle assembly.

Another object of this invention is to provide for a spindle which is easily removable from the vehicle axle.

Another object of this invention is to provide for a vehicle spindle assembly which allows for the simple removal of the spindle and which effectively distributes shear force across the connection of the spindle to the axle.

Another object of this invention is to provide for a vehicle spindle assembly which may be efficiently produced by automatic lathes.

Still another object of this invention is to provide for a vehicle spindle assembly which is durable and economical.

Other objects of this invention will become apparent upon a reading of the following description.

BRIEF DESCRIPTION OF THE DRAWINGS

A preferred embodiment of the invention has been chosen for purposes of illustration wherein.

DESCRIPTION OF THE PREFERRED EMBODIMENT

Figure 1:
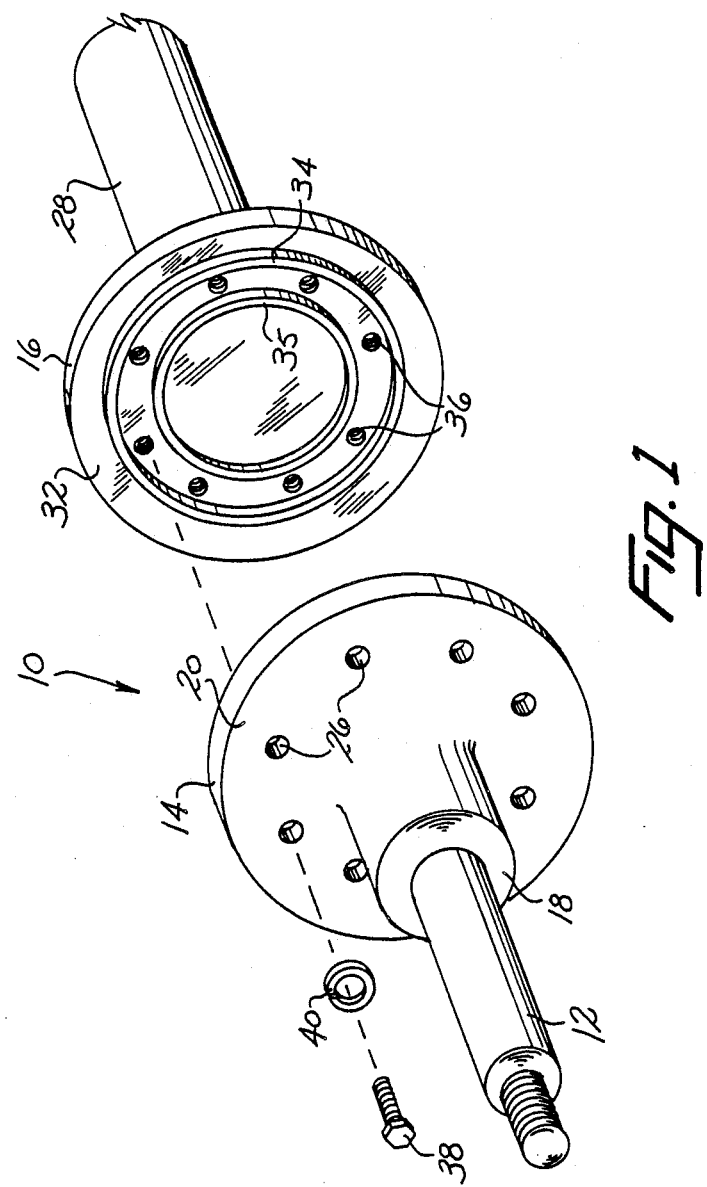
FIG. 1 is an exploded view of the spindle assembly.
Figure 2:
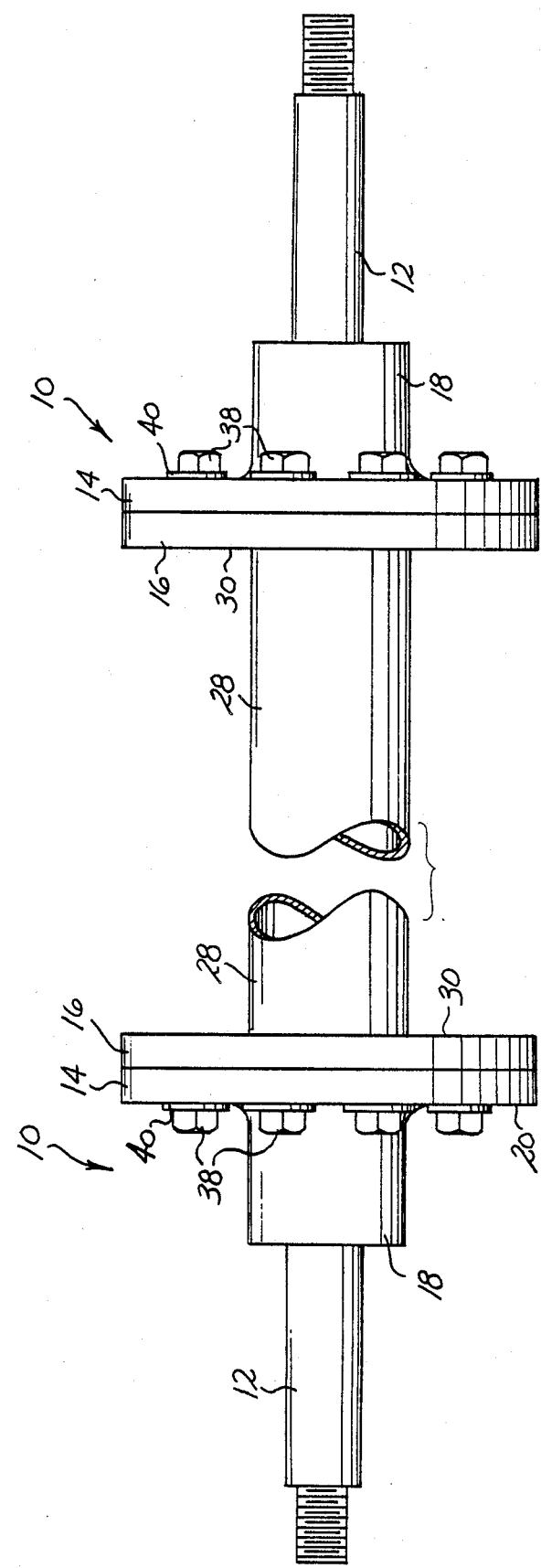
FIG. 2 is a fragmentary perspective view of an axle assembly utilizing the spindle assemblies of this invention.
Figure 3:
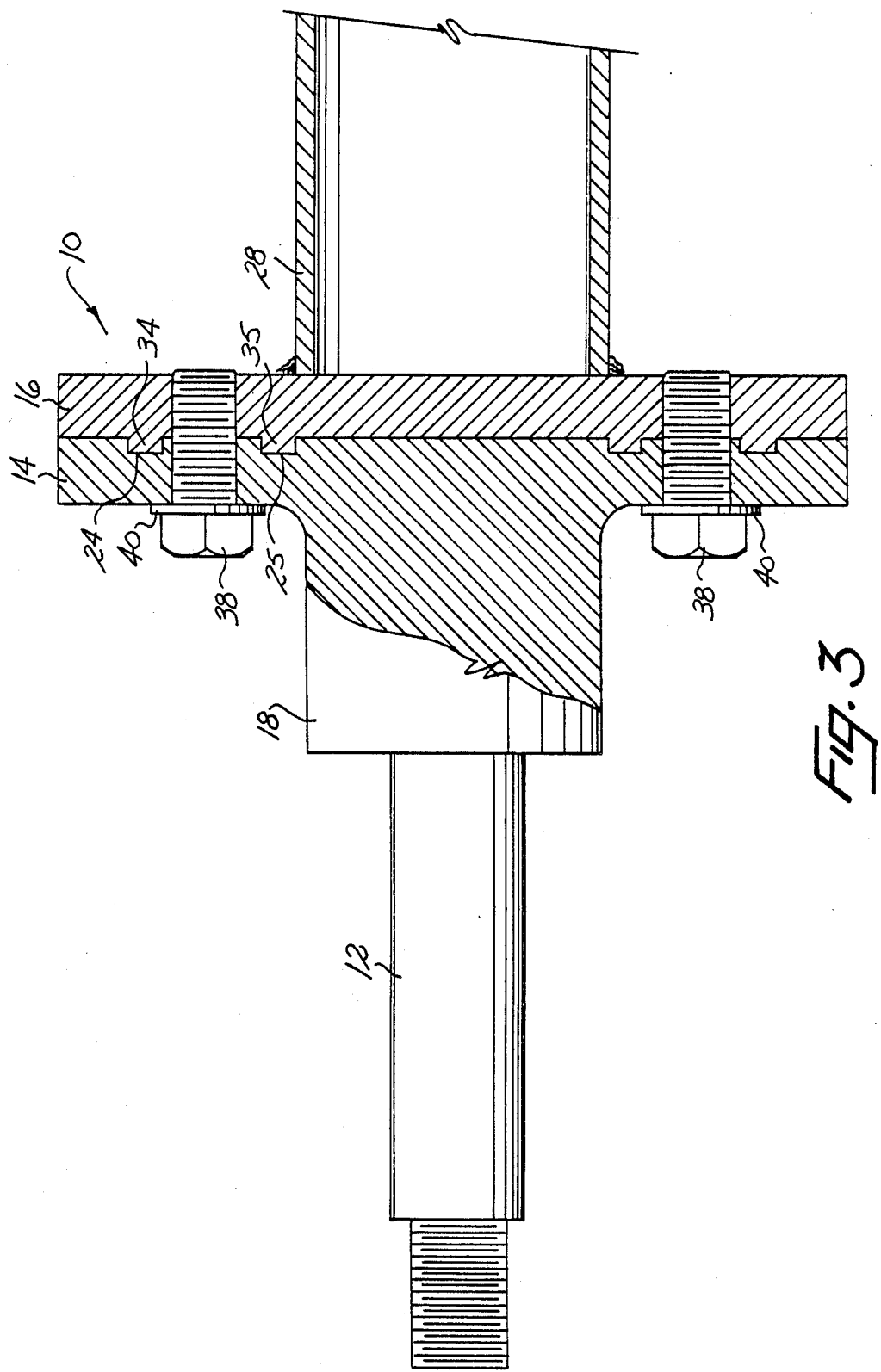
FIG. 3 is a fragmentary cross-sectional view of the spindle assembly.

The preferred embodiment herein described is not intended to be exhaustive or to limit the invention to the precise form disclosed. It is chosen and described to explain the principles of the invention and its application and practical use to enable others skilled in the art to utilize the invention.

The spindle assembly 10 of this invention is adapted for use with a conventional vehicle axle 28. Spindle assembly 10 is of two piece construction and includes plate members 14 and 16. Plate 14 includes a head 18 which projects from the outer face 20 of the plate and which is secured by welding to a spindle 12. Spindle 12 is adapted to house a wheel hub (not shown). The opposite or inner face 22 of plate 14 for a pair of concentric annular grooves 24 and 25 formed in it. Plate 14 also includes a plurality of annularly spaced bores 26 which extend from face 20 to face 22 of the plate. Bores 26 are preferably positioned between grooves 24 and 25. Plate 16 is welded to axle 28 at its outer face 30. The opposite or inner face 32 of plate 16 includes a pair of concentric annular ribs 34 and 35. Plate 16 also includes a plurality of annularly spaced threaded bores 36 which are positioned between ribs 34 and 35 and extend from face 30 to face 32 of plate 16.

To install spindle assembly 10, one places plate 16 over plate 14 with plate ribs 34 and 35 fitting complementally within the grooves 24 and 25 of plate 14. Bores 26 and 36 are then aligned. Bolts 38 are fitted freely through bores 26 and turned into threaded bores 36 to secure plate 16 to plate 14. A lock washer 40 is used with each bolt 38.

The interlock with ribs 34, 35 and grooves 24, 25 accommodates a good portion of the vertical shear stress placed upon bolts 38 during use of the axle assembly 10. Such interlock prevents transverse movement of plate 16 over plate 14. The width of ribs 34, 35 are sufficient to accommodate the vehicle load shear stress placed upon the connecting interfaces between plates 14 and 16.

It is to be understood that the scope of the invention is not limited to the above description but may be modified within the scope of the appended claims.

I claim:

1. A removable spindle in combination with an axle assembly, said spindle including a first plate member, a second plate member secured to the end of an axle, annularly positioned fasteners securing said first plate member at its inner face to said second plate member at its inner face, the improvement wherein said first plate member has an annular groove in its said inner face, said second plate member includes an annular rib extending from its said inner face, said rib fitting complementally within said groove.

2. The removable spindle and axle assembly of claim 1 wherein said first plate member has a second annular groove concentric with said first mentioned groove in its inner face, said second plate member includes a second annular rib concentric with said first mentioned rib extending from its said inner face, said second rib fitting complementally within said second groove.

* * * * *